J. F. MAST.
MACHINE FOR SNAPPING AND HUSKING EARS OF CORN.
APPLICATION FILED APR. 27, 1915.

1,196,258.

Patented Aug. 29, 1916.
4 SHEETS—SHEET 2.

Witnesses

Inventor
J. F. Mast
by
Attorneys.

J. F. MAST.
MACHINE FOR SNAPPING AND HUSKING EARS OF CORN.
APPLICATION FILED APR. 27, 1915.

1,196,258.

Patented Aug. 29, 1916.
4 SHEETS—SHEET 3.

Witnesses

J. F. Mast
Inventor,
by
Attorneys.

J. F. MAST.
MACHINE FOR SNAPPING AND HUSKING EARS OF CORN.
APPLICATION FILED APR. 27, 1915.
1,196,258.
Patented Aug. 29, 1916.
4 SHEETS—SHEET 4.
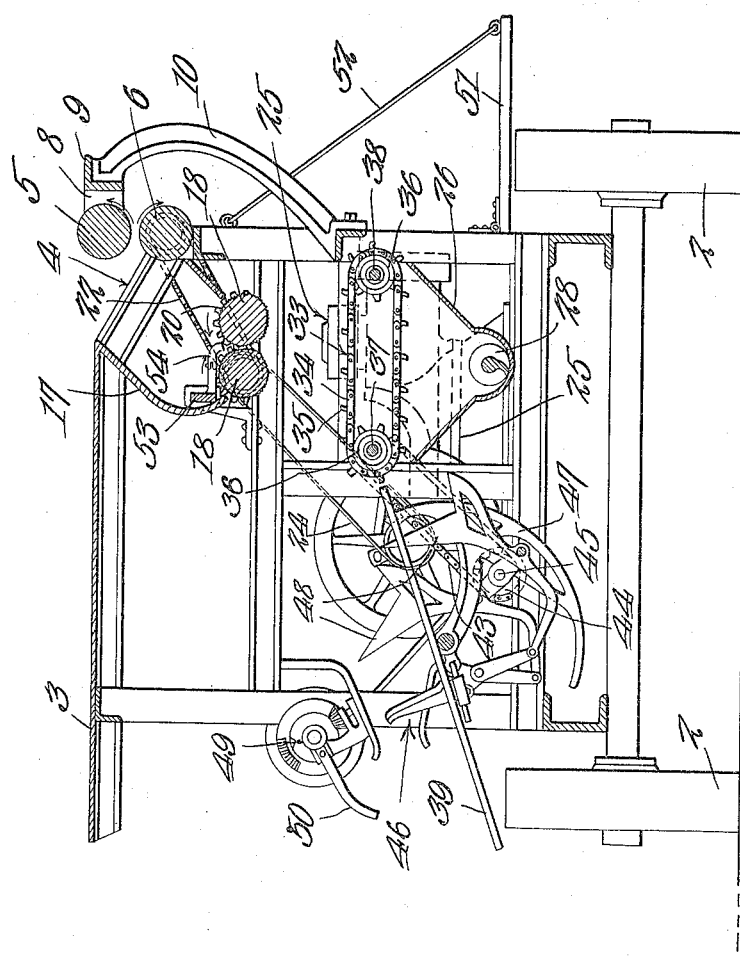

UNITED STATES PATENT OFFICE.

JOSEPH F. MAST, OF MILLERSBURG, OHIO.

MACHINE FOR SNAPPING AND HUSKING EARS OF CORN.

1,196,258. Specification of Letters Patent. Patented Aug. 29, 1916.

Application filed April 27, 1915. Serial No. 24,285.

*To all whom it may concern:*

Be it known that I, JOSEPH F. MAST, a citizen of the United States, residing at Millersburg, in the county of Holmes and State of Ohio, have invented a new and useful Machine for Snapping and Husking Ears of Corn, of which the following is a specification.

This invention relates to machines for use in snapping and husking ears of corn.

It is an object of the present invention to provide a machine adapted to be drawn over a field and on which the shocks are placed, the machine operating to remove the ears from the stalks, husk the ears, discharge the husked ears into a wagon or other receptacle provided for them, and return the stalks to approximately the positions from which they are removed, and with the husks commingled with them, mechanism being provided for tying together the stalks after the ears have been removed, so that they can be left standing in the field at practically the same points from which they were removed.

Another object is to provide a machine of this character which will operate readily, which will prevent waste of corn, and which requires the services of but two persons in handling the same, one to drive the machine and to feed the stalks to the snapping rolls, while the other operator is required for placing the stalks upon the machine and for lifting the tied bundles discharged from the machine and depositing them on end.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
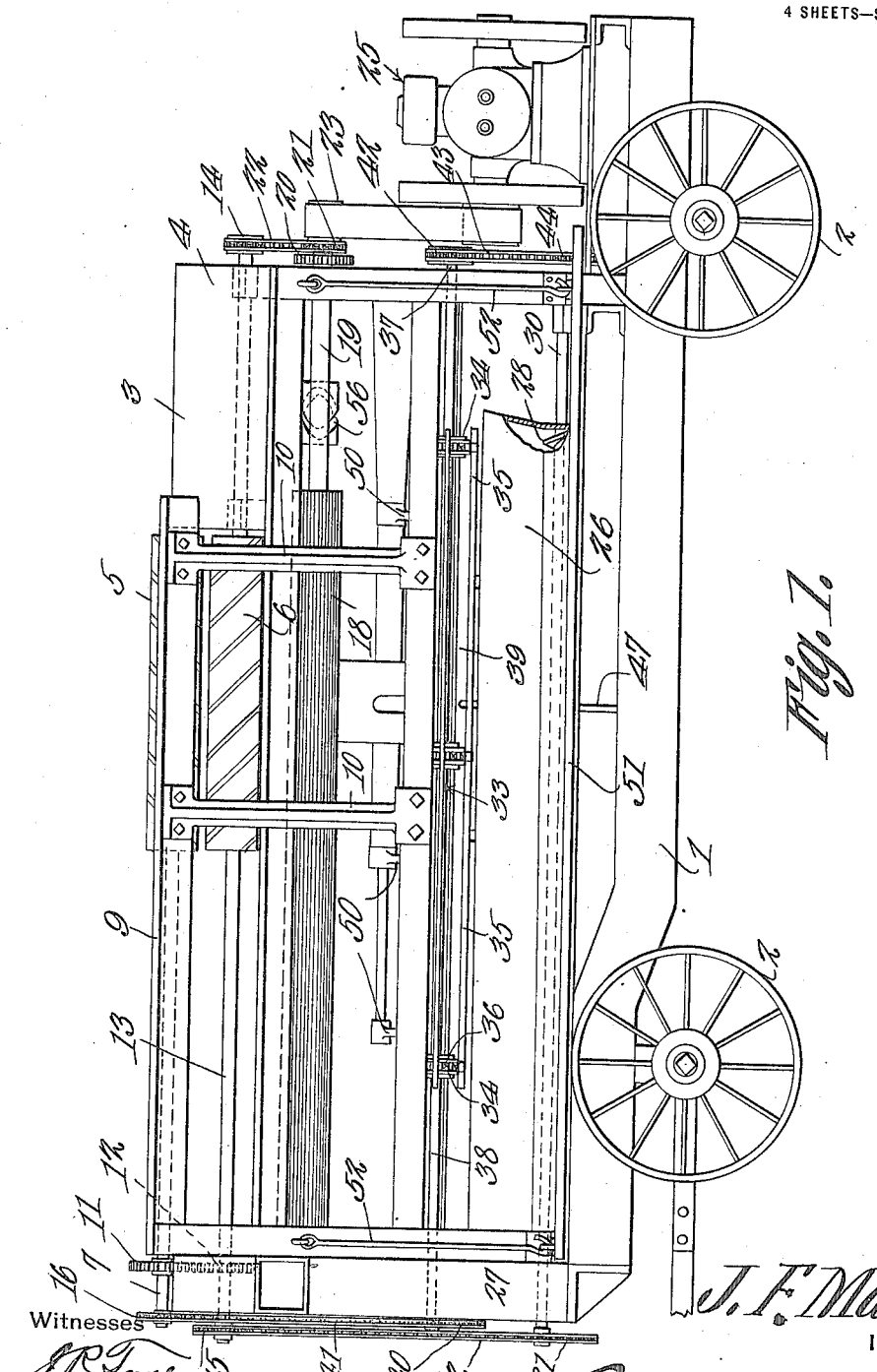
Figure 2:
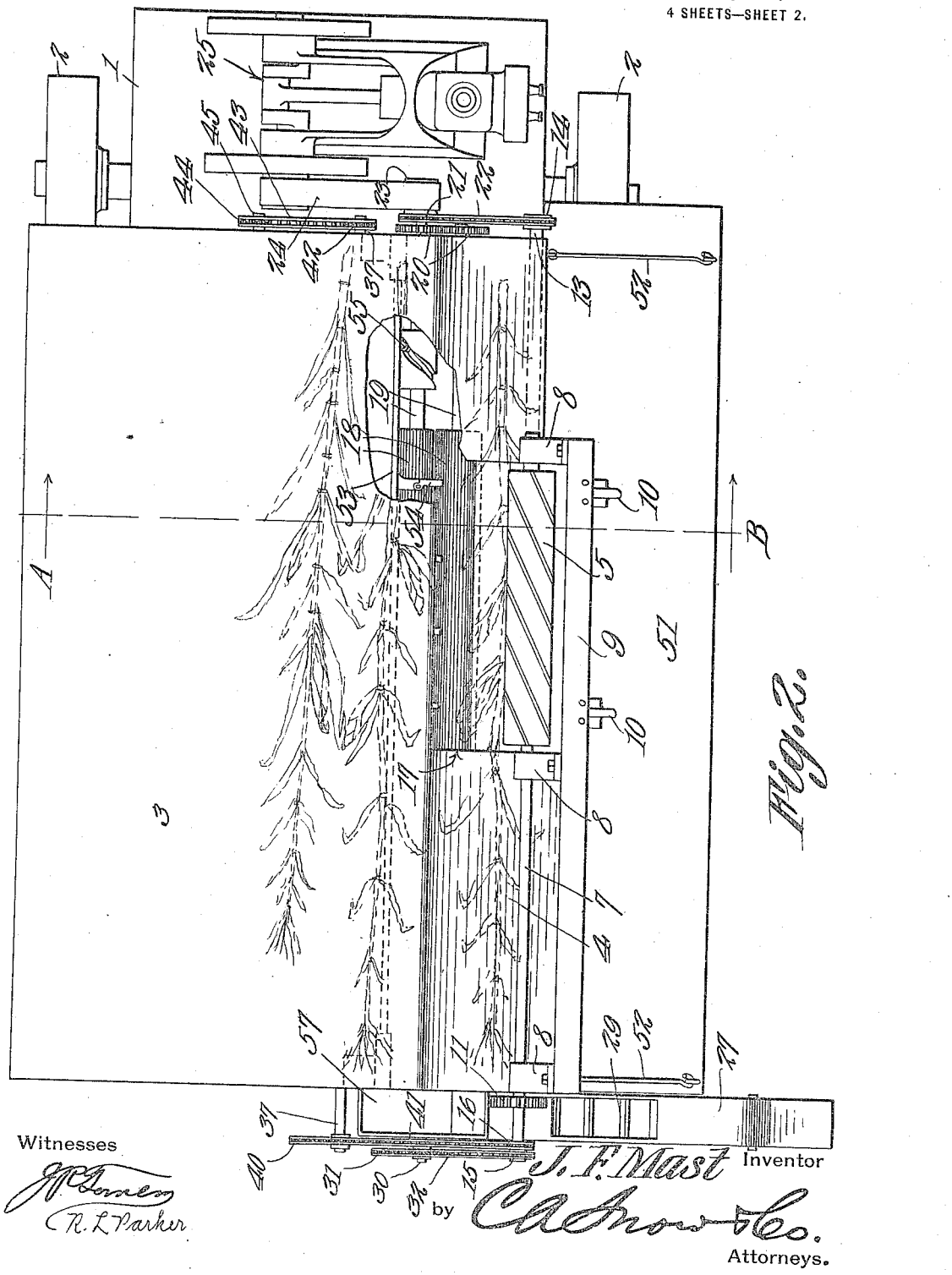
Figure 3:
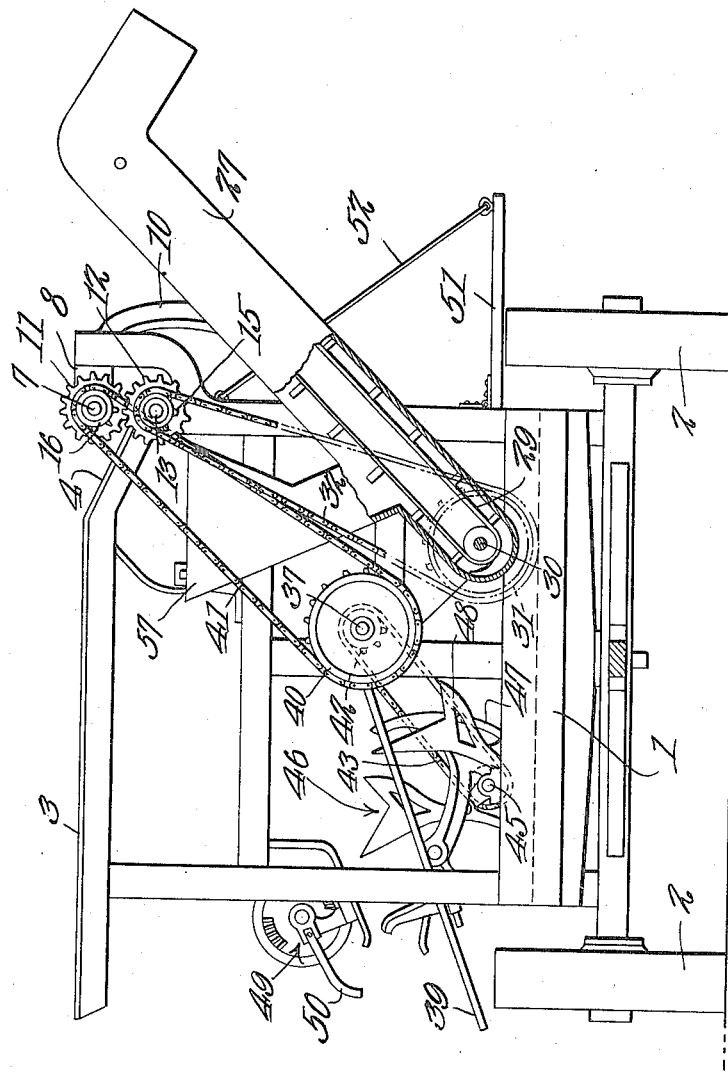

In said drawings:—Figure 1 is a side elevation of a machine embodying the present improvements. Fig. 2 is a plan view of the machine, a portion of the table being broken away. Fig. 3 is an end elevation, the elevator being shown partly in section. Fig. 4 is a section on line A—B Fig. 2.

Referring to the figures by characters of reference 1 designates a frame mounted upon supporting wheels 2, said frame supporting a table 3 one side portion of which is inclined downwardly as at 4 so as to feed stalks to the pass formed between upper and lower snapping rolls 5 and 6 which are arranged at one side of the machine. The shaft 7 of the upper snapping roll 5 is journaled within brackets 8 extending inwardly from a beam 9 which is fixedly secured to the frame 1 by curved guide arms 10 extending downwardly from the beam 9. Secured to shaft 7 is a gear 11 meshing with a gear 12 secured to the shaft 13 of the lower snapping roll 6 and this shaft 13 has a sprocket 14 secured to that end thereof remote from the gear 12. Secured to shaft 13 close to gear 12 is a sprocket 15 and another sprocket 16 is secured to shaft 7 close to gear 11.

That portion of the table 3 directly in front of the snapping rolls 5 and 6 is cut away to form the inlet of a hopper 17 at the bottom of which are arranged husking rolls 18. These husking rolls are mounted on longitudinal shafts 19 and secured to the said shafts are gears 20 constantly in mesh, whereby the husking rolls are caused to rotate in opposite directions.

Secured to the shaft 19 of one of the husking rolls is a sprocket 21 adapted to transmit motion through a chain 22 to the sprocket 14. A pulley 23 is secured to said shaft 19 and receives motion, through a belt 24, from a motor 25 mounted on the frame 1 beyond one end of the table 3.

Arranged under the husking rolls 18 is a hopper 26 extending up to the base of an elevator casing 27 located at one end of the frame 1. A conveying worm 28 is mounted for rotation in the bottom portion of the hopper 26 and an elevator 29 receives motion from one end portion of the shaft of the worm 28. This shaft, 30, of the worm 28 is provided with a sprocket 31 receiving motion, through a chain 32, from the sprocket 15.

Arranged within the frame 1 and between the hopper 26 and the husking rolls 18 is an endless conveyer 33 made up of chains 34 connected by slats 35. This conveyer is mounted on sprockets 36 secured to parallel longitudinal shafts 37 and 38 respectively, the upper and lower flights of the conveyer being in substantially horizontal planes, the upper flight extending from points adjacent the lower ends of the arms 10 and being adapted to deliver stalks onto the upper end of an inclined deck 39. A sprocket 40 is secured to one end portion of shaft 37 and receives motion, through a chain 41, from the sprocket 16. This shaft 37 is also provided with a sprocket 42 adapted to transmit motion through a chain 43 to a sprocket 44 secured to one of the shafts 45 of binding mechanism indicated generally at 46. This binding mechanism can be similar to that ordinarily employed in connection with grain binders and includes a needle 47, packing fingers 48, tying means indicated generally at 49, and an ejector 50. Inasmuch as the specific construction of the binding mechanism constitutes no part of the present invention, it is thought that a general showing will be sufficient in the present instance. It will be noted that the deck 39 discharges bundles from that side of the machine remote from the snapping rolls 5 and 6.

A platform 51 is connected to one side of the frame 1 close to the arms 10 and may be braced in any desired manner, as by means of hanging rods 52.

In using the machine herein described, the motor drives the various parts of the mechanism but preferably has nothing to do with the propulsion of the machine. The machine can be drawn from place to place by means of draft animals, as ordinarily.

As heretofore pointed out, two operators are preferably required in order to use the machine for the purposes intended. The machine is brought to a stand opposite a shock and one operator lifts the shock onto the table 3 where it is spread out with the butt ends toward the motor or front end of the machine. The other operator feeds the stalks sidewise down the inclined portion of the table 4, the butt ends passing between the front ends of the snapping rolls 5 and the front end of the machine, while only those portions of the stalks carrying the ears will pass between the snapping rolls 5 and 6. The ears will be snapped from the stalks and will fall into the hopper 17 where they will be engaged by the husking rolls 18. The husks will drop onto the moving conveyer 33, mixing with the stalks which, after passing between the snapping rolls 5 and 6, are guided downwardly and inwardly by the arms 10 and onto the upper flight of conveyer 33. The stalks and ears together are discharged by the conveyer 33 onto the deck 39 where they are bound together into a shock and the shock is delivered to the ground so that the person who placed the stalks on the table 3 is in a position to lift the bound shock from the ground and set it up on end before the machine is moved to the next point in the field where the foregoing operation is to be repeated. Any loose corn which may fall through the husking rolls will pass through the conveyer 33 and into the hopper 26. The corn from which the husks have been removed may be delivered longitudinally along the rolls 18 and into the hopper 26 and in any suitable manner, as by means of a reciprocating feeding bar 53. As shown particularly in Fig. 2, this bar has its fingers 54 hingedly connected to it and moving close to the pass between the husking rolls 18. Said bar has a stud 55 extending from it and working within a cam 56 which rotates with one of the shafts 19. Thus during the rotation of the husking rolls, bar 53 will be reciprocated and will work the husked ears longitudinally along the rolls 18 and pass the ends of said rolls, whereupon they will drop into a hopper 57 which discharges onto the elevator 29. The worm conveyer 28 will carry shelled corn to the elevator 29 which will operate to convey said corn and the ears upwardly to a wagon traveling close to one side of the machine.

What is claimed is:—

1. A machine for snapping and husking corn, comprising snapping rolls, a table for feeding stalks sidewise from one side of the machine to the rolls, a conveyer below the table, means for directing stalks from the snapping rolls downwardly and inwardly onto the conveyer, and means for driving the conveyer to return the stalks to that side of the machine from which they were initially fed.

2. A machine of the class described comprising snapping rolls, husking rolls, a conveyer below the rolls, means for feeding stalks from one side of the machine to the snapping rolls, means for directing stalks from the snapping rolls onto the conveyer, said husking rolls constituting means for discharging husks onto the conveyer, and means for driving the conveyer to return the stalks and husks to that side of the machine from which they were initially fed.

3. A machine for snapping and husking corn, including snapping rolls, a table for feeding stalks sidewise from one side of the machine to the snapping rolls, husking rolls for receiving the ears from the snapping rolls, a conveyer arranged transversely under the snapping and husking rolls, means for guiding stalks from the snapping rolls and into position on the conveyer and below the husking rolls, said husking rolls constituting means for discharging husks onto the conveyer, means for actuating the conveyer to direct the stalks and husks toward that side of the machine from which they were initially fed, and means for delivering said stalks and husks from said side of the machine.

In testimony that I claim the foregoing as my own, I have hereto affixed my signature in the presence of two witnesses.

JOSEPH F. MAST.

Witnesses:
PEARL M. ETTER,
GEO. W. SHARP.

Copies of this patent may be obtained for five cents each, by addressing the "Commissioner of Patents, Washington, D. C."